United States Patent

Kumabe et al.

(10) Patent No.: US 9,904,474 B2
(45) Date of Patent: Feb. 27, 2018

(54) CONTROL DEVICE AND STORAGE SYSTEM

(71) Applicant: FUJITSU LIMITED, Kawasaki-shi, Kanagawa (JP)

(72) Inventors: Takuro Kumabe, Kawasaki (JP); Akihito Kobayashi, Kawasaki (JP); Motohiro Sakai, Nerima (JP); Shinichiro Matsumura, Kawasaki (JP); Takahiro Ohyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 304 days.

(21) Appl. No.: 14/822,171

(22) Filed: Aug. 10, 2015

(65) Prior Publication Data

US 2016/0085446 A1 Mar. 24, 2016

(30) Foreign Application Priority Data

Sep. 18, 2014 (JP) .................................. 2014-189928

(51) Int. Cl.
 *G06F 3/06* (2006.01)
 *G06F 12/08* (2016.01)
 *G06F 12/12* (2016.01)
 *G06F 12/0811* (2016.01)

(52) U.S. Cl.
 CPC ............ *G06F 3/061* (2013.01); *G06F 3/0649* (2013.01); *G06F 3/0685* (2013.01); *G06F 12/0811* (2013.01); *G06F 12/12* (2013.01)

(58) Field of Classification Search
 CPC ...... G06F 3/061; G06F 3/0649; G06F 3/0685; G06F 12/0811; G06F 12/12
 See application file for complete search history.

(56) References Cited

U.S. PATENT DOCUMENTS

| 2002/0108020 | A1  | 8/2002  | Take et al. |
| 2010/0332778 | A1  | 12/2010 | Wada |
| 2012/0303929 | A1* | 11/2012 | Chiu ................. G06F 17/30091 711/173 |
| 2012/0317355 | A1* | 12/2012 | Ishizaki ................ G06F 3/0607 711/114 |
| 2013/0024650 | A1* | 1/2013  | Ambat .................... G06F 3/061 711/209 |
| 2015/0039825 | A1* | 2/2015  | Anderson ............. G06F 3/0685 711/114 |
| 2015/0121024 | A1* | 4/2015  | Kolvick ................ G06F 3/0647 711/162 |

FOREIGN PATENT DOCUMENTS

| JP | 2000-181763 | 6/2000 |
| JP | 2011-13800  | 1/2011 |

\* cited by examiner

*Primary Examiner* — Aracelis Ruiz

(74) *Attorney, Agent, or Firm* — Staas & Halsey LLP

(57) ABSTRACT

A control device includes a processor. The processor is configured to collect plural types of performance information regarding a first data unit. The processor is configured to determine, on basis of the collected plural types of performance information, whether to transfer the first data unit from a first storage device which is under control of a first controller to a second storage device which is positioned as higher than the first storage device. The processor is configured to transfer the first data unit from the first storage device to the second storage device depending on a result of the determination.

20 Claims, 9 Drawing Sheets

| Byte0 | Byte1 | Byte2 | Byte3 |
|---|---|---|---|
| I/O Count[0] | I/O Count[1] | I/O Count[2] | I/O Count[3] |
| I/O Count[4] | ... | | |

| Byte0 | Byte1 | Byte2 | Byte3 |
|---|---|---|---|
| Cache Hit Rate[0] | Straight Access Rate[0] | Cache Hit Rate[1] | Straight Access Rate[1] |
| Cache Hit Rate[2] | Straight Access Rate[2] | ... | |

CONTROL DEVICE AND STORAGE SYSTEM

CROSS-REFERENCE TO RELATED APPLICATION

This application is based upon and claims the benefit of priority from the prior Japanese Patent Application No. 2014-189928, filed on Sep. 18, 2014, the entire contents of which are incorporated herein by reference.

FIELD

The embodiments discussed herein are related to a control device and a storage system.

BACKGROUND

An automated storage tiering (AST) technology has been introduced in a storage system. The AST is a technology that automatically transfers and relocates data between storage tiers in accordance with a predetermined policy. For example, the storage tiers are constructed by a solid state drive (SSD) that has a short response time but with a high cost per unit capacity and a hard disk drive (HDD) that has a long response time but with a low cost per unit capacity. A more frequently accessed data unit is transferred to the SSD to be relocated, while a less frequently accessed data unit is transferred to the HDD to be relocated. Accordingly, a high performance (speed up of response) may be achieved in the storage system while maintaining a large capacity.

Here, descriptions will be made on a configuration and operations of a storage system in which the AST technology is employed with reference to FIG. 9. A storage system illustrated in FIG. 9 includes two host computers (hereinafter, simply referred to as hosts) #0 and #1, a parent pool FTRP (flexible tier pool) including a plurality of storage devices (SSDs, HDDs, or the like), and a control device.

The control device is provided between the hosts #0 and #1 and the parent pool FTRP, and includes two control units CMs (Controller Modules) #0 and #1, each of which performs an input/output control for the parent pool FTRP in response to input/output requests from the hosts #0 and #1. Each of the CMs #0 and #1 is provided with a cache memory which temporarily holds a data unit stored in the parent pool FTRP. The CMs #0 and #1 are communicably connected with each other.

In the parent pool FTRP, a plurality of child pools FTSPs (flexible tier sub pools) implemented with different levels of RAIDs (redundant arrays of inexpensive disks), or a plurality of child pools FTSPs implemented with RAIDs constructed of different types of disks are prepared using the plurality of storage devices to form storage tiers.

In the parent pool FTRP illustrated in FIG. 9, three child pools FTSP #0, FTSP #1, and FTSP #2 are prepared, the child pool FTSP #0 is under the control of the CM #0, and the child pools FTSP #1 and FTSP #2 are under the control of the CM #1. The child pool FTSP #0 has the highest performance (shortest response time), the child pool FTSP #1 has the second highest performance (second shortest response time), and the child pool FTSP #2 has the lowest performance (longest response time). For example, the child pool FTSP #0 is an SSD, the child pool FTSP #1 is a RAID1 or an online HDD, and the child pool FTSP #2 is a RAID5 or a near line HDD.

In the storage system, a volume (logical volume) of the AST is associated with the parent pool FTRP. A finely divided unit TPPE (thin provisioning pool element) is allocated to the volume of the AST from the child pools FTSP #0, FTSP #1, and FTSP #2 in a stage where the volume is written into the parent pool FTRP. The unit is called a chunk, and a plurality of chunks collected into a single group is called an FTRPE, a chunk collection, a chunk group, a data block, a transfer unit, or a data unit.

The performance information is collected for each data unit. The performance information is, for example, an access frequency (number of accesses per unit time) of the data unit. It is determined, based on the collected access frequency, whether each data unit is to be transferred to a child pool residing in a higher tier, to a child pool residing in a lower tier, or is not to be transferred to another child pool. Each data unit is transferred and relocated depending on the determination result. For example, as illustrated in FIG. 9, when the access frequency of data unit D0 placed on the child pool FTSP #1 becomes greater than a predetermined threshold value, the data unit D0 is transferred from the child pool FTSP #1 to the child pool FTSP #0 of the higher tier to be relocated in the child pool FTSP #0, as illustrated by an arrow A0.

As a related technology, there has been known a cache control device that controls a cache operation of a storage system including a plurality of cache modules connected with each other and storage modules connected to the cache modules. In the cache control device, a page having a high possibility of receiving an access request among the pages managed by a certain cache module is held in a memory of the cache module. In the meantime, a page having a low possibility of receiving the access request is allocated to another cache module.

As another related technology, there has been known a technology that migrates a virtual logical volume to a real logical volume, in a case where a use rate of the virtual logical volume exceeds a threshold value and a physical storage area corresponding to a storage area of the virtual logical volume is managed by another control unit.

Related technologies are disclosed in, for example, Japanese Laid-Open Patent Publication No. 2000-181763 and Japanese Laid-Open Patent Publication No. 2011-13800.

When access frequencies are gathered as the performance information and more frequently accessed data units are simply transferred to the higher tier to be relocated as described above, performance degradation may be caused in the following cases (1) and (2).

(1) A case where a straight access is made to the data unit before the data unit is transferred and a cross access is made to the data unit after the data unit is transferred:

For example, as illustrated in FIG. 9, in a state where the data unit D0 before being transferred is placed on the child pool FTSP #1 under the control of the CM #1, the straight access to the data unit D0 is made when an input/output request for the data unit D0 is received from the host #1 (see an arrow i in FIG. 9). It is assumed that this state is changed to a state where the data unit D0 is transferred to the child pool FTSP #0 of the higher tier under the control of the CM #0 to be relocated (see the arrow A0 in FIG. 9). When an input/output request for the data unit D0 after having been transferred is received from the host #1, the cross access including communications between the CM #1 and CM #0 is made to the data unit D0 residing on the child pool FTSP #0 (see an arrow ii in FIG. 9). Different from the straight access, the cross access includes communications between the CMs so that a response becomes slower when the cross access occurs, thereby causing a performance degradation.

(2) A case where an access to a disk hardly occurs due to a high cache hit rate of the data unit intended to be transferred.

For example, as illustrated in FIG. 9, in a state where the data unit D0 which is a target data unit to be transferred is held in a cache memory of the CM #1, the cache hit rate of the target data unit D0 to be transferred is increased when an input/output request for the data unit D0 is received from the host #1 (see an arrow iii). Accordingly, access to the child pool FTSP #1 hardly occurs. When this state is changed to a state where the data unit D0 is transferred to the child pool FTSP #0 of the higher tier under the control of the CM #0 to be relocated (see the arrow A0 in FIG. 9), the data unit D0 is not hit in the cache memory of the CM #1, thereby causing a performance degradation.

SUMMARY

According to an aspect of the present invention, provided is a control device including a processor. The processor is configured to collect plural types of performance information regarding a first data unit. The processor is configured to determine, on basis of the collected plural types of performance information, whether to transfer the first data unit from a first storage device which is under control of a first controller to a second storage device which is positioned as higher than the first storage device. The processor is configured to transfer the first data unit from the first storage device to the second storage device depending on a result of the determination.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a first table;

FIG. 5 is a diagram illustrating an example of a second table;

DESCRIPTION OF EMBODIMENTS

Figure 1:
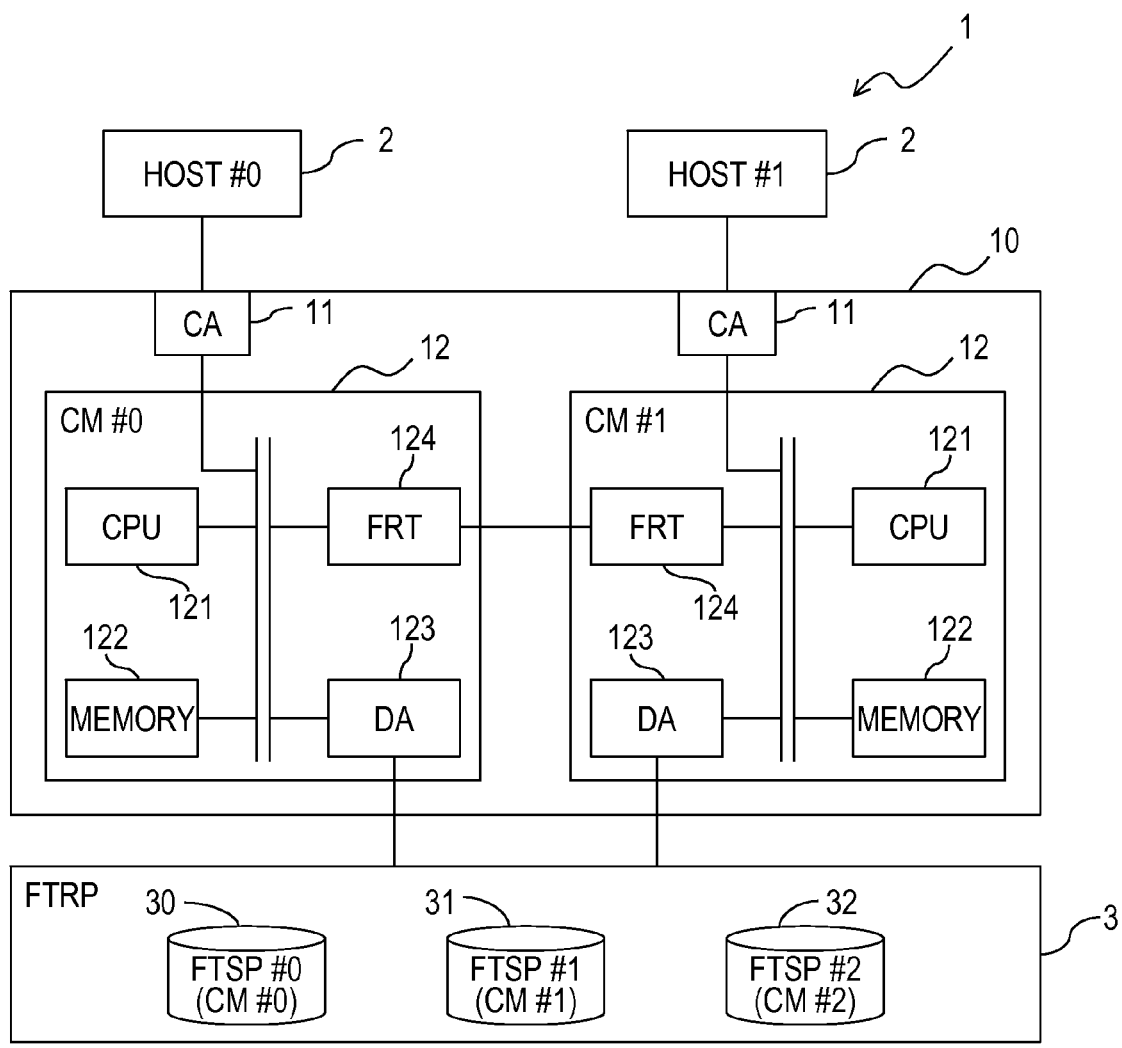
FIG. 1 is a block diagram illustrating a hardware configuration of a storage system including a control device according to a first embodiment.

Hereinafter descriptions will be made in detail on a control device and a storage system according to embodiments with reference to accompanying drawings. However, the embodiments are illustrative only and do not intend to exclude various modifications and application of technologies not explicitly described in the embodiment. That is, the embodiments may be practiced in various modifications without departing from a gist of the present disclosure. Further, each drawing does not intend to include solely the constitutional elements illustrated in the drawing, and may include other functions. Also, embodiments may be suitably combined within a range in which processing contents are not inconsistent with each other.

First Embodiment

As described above with reference to FIG. 9, in the case of (1) or (2) described above, simply transferring more frequently accessed data unit to the higher tier to be relocated is likely to cause degradation in performance.

Accordingly, a control device according to a first embodiment controls a placement state of data of a predetermined access unit in storage devices residing in a plurality of tiers for each data unit and collects plural types of performance information for each data unit (collection part). The control device determines whether each data unit is to be transferred from a storage device storing each data unit to a storage device of a higher tier on the basis of the plurality of types of collected performance information (transfer determination part), and transfers each data unit between the storage devices of the plurality of tiers depending on the determination result (transfer control part).

For example, an access frequency used for both a transfer determination whether to transfer the data unit to a higher tier and a transfer determination whether to transfer the data unit to a lower tier as will be described below is contained in the plural types of performance information collected for each data unit. For example, at least one of a straight access rate and a cache hit rate used for the transfer determination whether to transfer the data unit to a higher tier as will be described below is contained in the plural types of performance information. In the present embodiment, descriptions will be made on a case where both of the straight access rate and the cache hit rate are collected as the plural types of performance information.

The access frequency which is the minimum required performance information is collected for each data unit and registered in a first table T1 (see FIG. 4), as will be described below. The straight access rate and the cache hit rate that correspond to detailed performance information are collected for a data unit having a relatively high access frequency and a high possibility of transferring to a higher tier, and registered in a second table T2 (see FIG. 5), as will be described below.

In this case, when the data unit having a relatively high access frequency exists, the control device according to the present embodiment does not immediately determine that the data unit is to be transferred to a higher tier and performs a transfer determination whether to transfer the data unit to a higher tier after securing a memory area (see a second table information storage area 122b of FIG. 2) which stores the second table T2 and collecting the detailed performance information described above. When the access frequency of the data unit is reduced, the control device according to the present embodiment releases the memory area secured for the second table T2. In this way, the control device according to the present embodiment may collect the straight access rate and the cache hit rate that correspond to the detailed performance information, while suppressing an increase of the memory capacity required for securing the second table T2 to the minimum.

A case where the straight access rate collected for the data unit is high even though the access frequency collected for the data unit is high is considered as corresponding to the case (1) described above. In this case, the control device according to the present embodiment determines that the degradation in performance may be caused when the data unit is transferred to a higher tier, and determines that the data unit is not to be transferred to a higher tier.

A case where the cache hit rate collected for the data unit is high even though the access frequency collected for the data unit is high is considered as corresponding to the case (2) described above. In this case, the control device according to the present embodiment determines that the degradation in performance may be caused when the data unit is transferred to a higher tier, and determines that the data unit is not to be transferred to a higher tier.

Descriptions will be made on a hardware configuration of a storage system 1 including a control device 10 according to the first embodiment with reference to the block diagram illustrated in FIG. 1.

The AST technology is employed in the storage system 1 illustrated in FIG. 1, and the storage system 1 includes two hosts 2 (host #0 and host #1), a parent pool 3 (FTRP; disk enclosure) including, for example, a plurality of storage devices (SSDs, HDDs, or the like), and a control device 10 including two CMs 12 (CM #0 and CM #1).

In the parent pool 3 (FTRP), a plurality of child pools 30, 31, and 32 (FTSPs) implemented with different levels of RAIDs, or a plurality of child pools 30, 31, and 32 (FTSPs) implemented with RAIDs constructed of different types of disks are prepared using, for example, a plurality of storage devices (SSDs, HDDs, or the like) to form storage tiers.

In the parent pool 3 illustrated in FIG. 1, three child pools 30, 31, and 32 (plural types of storage devices; FTSPs #0, #1, #2) are prepared and, for example, the child pool 30 is under the control of the CM #0 and the child pools 31 and 32 are under the control of the CM #1. The child pool 30 has the highest performance (shortest response time), the child pool 31 has the second highest performance (second shortest response time), and the child pool 32 has the lowest performance (longest response time). For example, the child pool 30 is an SSD, the child pool 31 is a RAID1 or an online HDD, and the child pool 32 is a RAID5 or a near line HDD.

Figure 9:
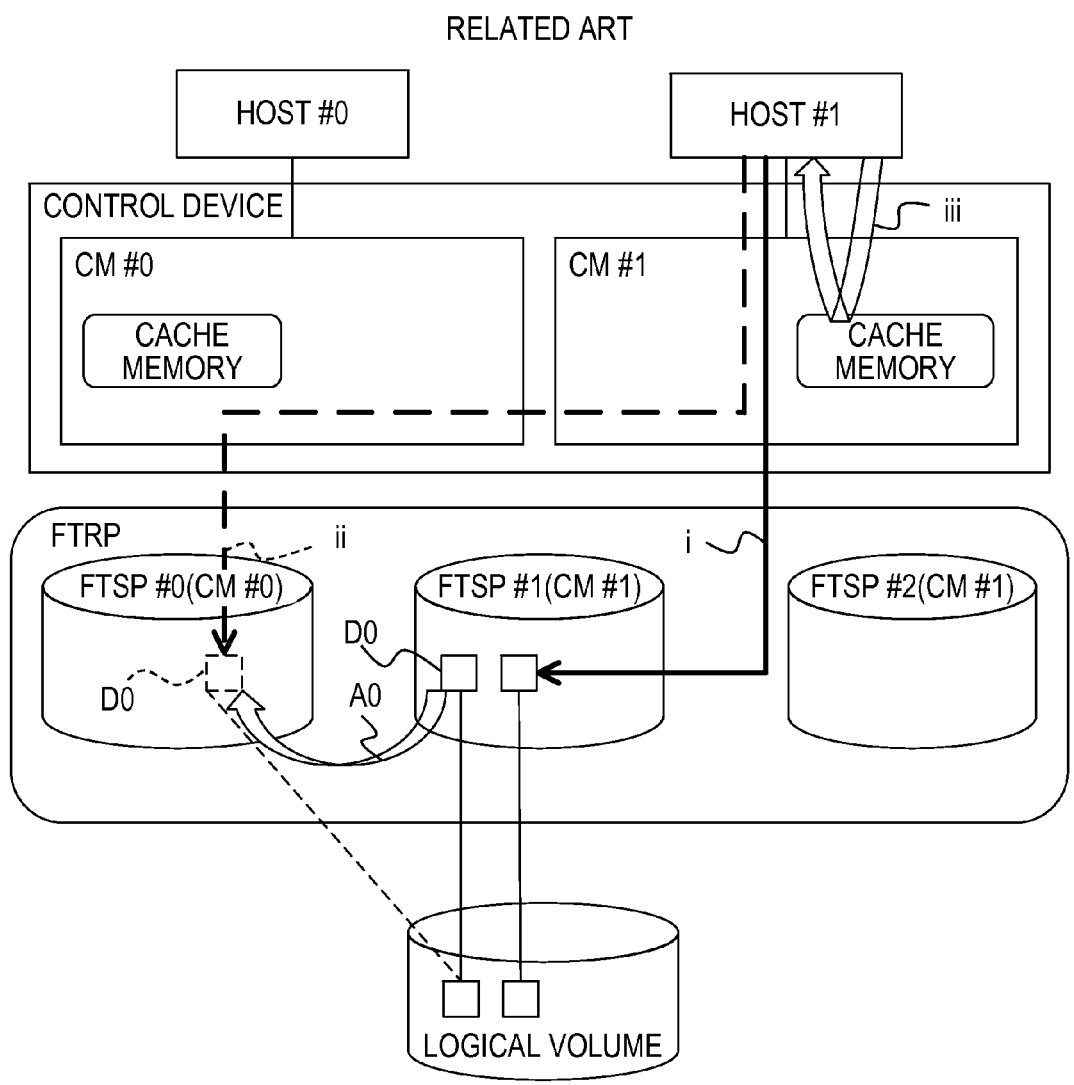
FIG. 9 is a diagram illustrating a configuration and operations of the storage system in which an AST technology is employed.

Similarly to an example illustrated in FIG. 9, also in the storage system 1 according to the present embodiment, a volume (logical volume) of the AST is associated with the parent pool 3. A finely divided unit TPPE is allocated to the volume of the AST from the child pools 30, 31, and 32 in a stage where the volume is written into the parent pool 3. The unit is called a chunk. A plurality of chunks collected into a single group correspond to data of a predetermined access unit, and is called an FTRPE, a chunk collection, a chunk group, a data block, a transfer unit, or a data unit. Hereinafter, the data of a predetermined access unit is referred to as a data unit in the present embodiment.

The control device 10 according to the present embodiment is provided between the hosts #0 and #1 and the parent pool 3. The control device 10 includes two channel adapters (CAs) 11 and two control units 12 (CM #0 and CM #1).

The CAs 11 are interfaces connected to the hosts 2 to control communications with the hosts 2. The CAs 11 are provided to the hosts #0 and #1, respectively.

The CMs 12 (computers) perform an input/output control to the parent pool 3 in accordance with input/output requests (I/O commands) from the hosts #0 and #1, respectively.

Each of the CMs 12 includes a central processing unit (CPU) 121, a memory 122, a device adapter (DA) 123, and a front-end router (FRT) 124.

The memory 122 may include, for example, a random access memory (RAM), an HDD, and an SSD. The memory 122 serves as a cache memory temporarily holding a data unit stored in the parent pool 3 when an access to the parent pool 3 (child pools 30, 31, and 32) is made. Further, the memory 122 serves as a main memory at the time when the CPU 121 executes an arithmetic processing. In the memory 122, a first table information storage area 122a (see FIG. 2) for storing information for a first table T1 (see FIG. 4) is secured and the second table information storage area 122b (see FIG. 2) for storing information for the second table T2 (see FIG. 5) is secured as necessary. A cache area 122c serving as the cache memory is also secured in the memory 122.

Further, a first, second, third, fourth, and fifth threshold values to be described below may be set and stored in the memory 122 in advance. In the memory 122, a control program executed by the CPU 121 may be stored in order for the CPU 121 to serve as a collection part 121a, a transfer determination part 121b, a transfer control part 121c, a switching determination part 121d, and a switching control part 121e to be described below with reference to FIG. 2. The first to the fifth threshold values may be set in a form of being incorporated in the control program.

The control program is provided in a form of being recorded in a computer-readable recording medium such as a flexible disk, a compact disc (CD) such as CD-ROM, CD-R, and CD-RW, a digital versatile disc (DVD) such as DVD-ROM, DVD-RAM, DVD-R, DVD-RW, DVD+R, and DVD+RW, and a Blu-ray disk. In this case, the CPU 121 uses the program in such a way that the program is read from the recording medium and the read program is transmitted to an internal storage device (for example, memory 122) or an external storage device to be stored therein.

The DA 123 is an interface connected with the parent pool 3 to control an access to the parent pool 3 (child pools 30, 31, and 32).

The FRT 124 is an interface connected with an FRT 124 of another CM 12 through a communication path to control communications between the CMs 12. The CM #0 and CM #1 are communicably connected with each other through the FRT 124.

Figure 2:
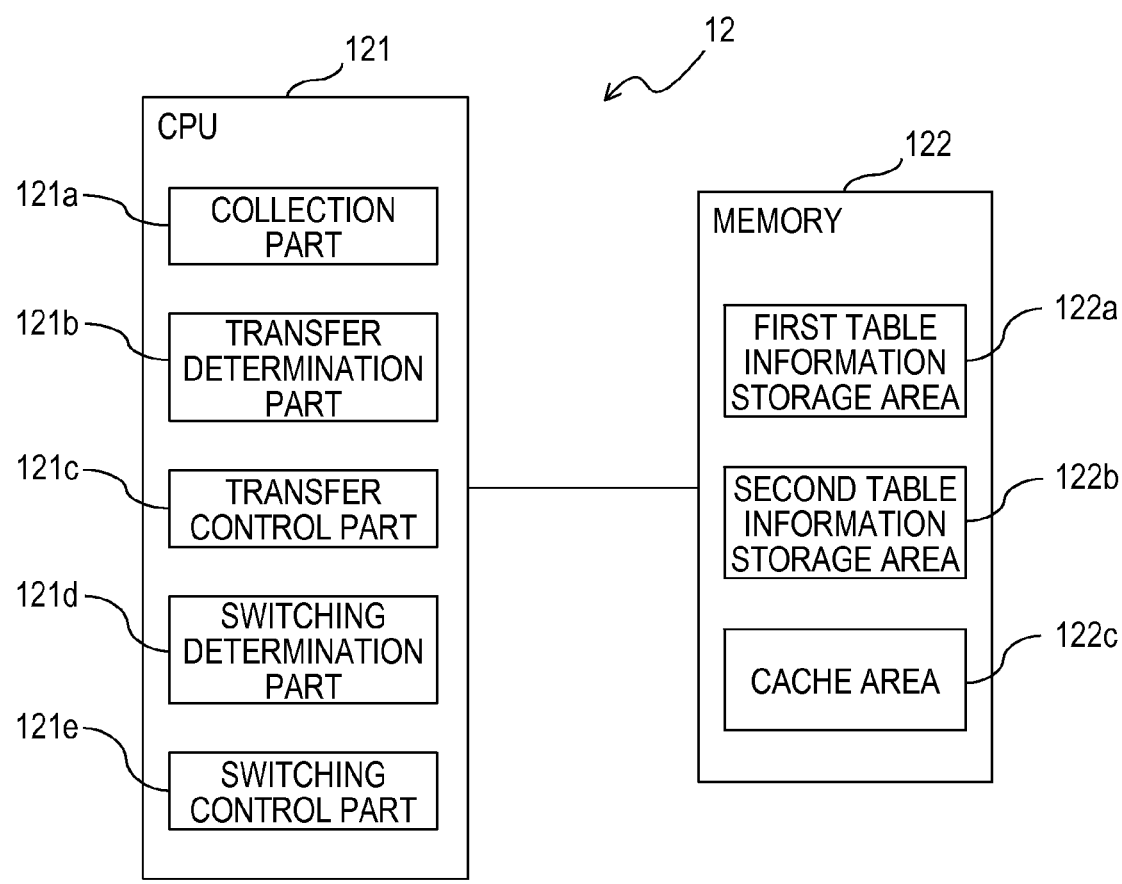
FIG. 2 is a block diagram illustrating a functional configuration of the control device illustrated in FIG. 1.

Next, descriptions will be made on a functional configuration of the CM 12 of the control device 10 illustrated in FIG. 1 with reference to the block diagram illustrated in FIG. 2. The functional configuration illustrated in FIG. 2 is provided in at least one of the two CMs 12. As illustrated in FIG. 2, the CPU 121 in the CM 12 executes the control program to function as the collection part 121a, the transfer determination part 121b, the transfer control part 121c, the switching determination part 121d, and the switching control part 121e. At this time, the first table T1 is spread on the memory 122 on the basis of information contained in the first table information storage area 122a, and the second table T2 is also spread on the memory 122 on the basis of information contained in the second table information storage area 122b. The first to the fifth threshold values on the memory 122 are referenced as well as the first table T1 and the second table T2 spread on the memory 122.

Descriptions will be made on the first table T1, the second table T2, and the first to the fifth threshold values on the memory 122.

The first table T1 is a performance information management table (see FIG. 4) that stores the minimum required performance information such as the access frequency collected by the collection part 121a for each data unit. The access frequency is the number of accesses to each data unit per unit time. The performance information (access frequency) stored in the first table T1 is updated by the collection part 121a at the time when processing according to an I/O command from the host 2 is completed.

The second table T2 is a performance information management table (see FIG. 5) that stores detailed performance information such as the straight access rate and the cache hit rate collected by the collection part 121a for each data unit. The straight access rate is a ratio of the number of memory accesses (see the arrow i in FIG. 9) directly made to each data unit without using communications between the CMs to the total number of accesses to each data unit. The cache hit rate is a ratio of the number of cache hits (the accessed data unit exists on the cache memory 122c; see the arrow iii in FIG. 9) to the total number of accesses to each data unit. The performance information (straight access rate and cache hit rate) stored in the second table T2 is also updated by the collection part 121a at the time when processing according to the I/O command from the host 2 is completed.

The first threshold value is a predetermined threshold value for switching determination to be compared with the access frequency by the switching determination part 121d to be described below. The first threshold value is used for determining whether to perform a determination by the transfer determination part 121b using either only the first table T1 or both of the first table T1 and the second table T2.

The second threshold value is a predetermined threshold value for higher tier transfer determination to be compared with the access frequency by the transfer determination part 121b to be described below when determining whether to transfer each data unit to a higher tier.

The third threshold value is a predetermined threshold value for lower tier transfer determination to be compared with the access frequency by the transfer determination part 121b when determining whether to transfer each data unit to a lower tier.

The magnitude relation between the first threshold value, the second threshold value, and the third threshold value to be compared with the access frequency as described above is as follows;

second threshold value>first threshold value>third threshold value

The fourth threshold value is a predetermined threshold value of cache hit rate to be compared with the cache hit rate by the transfer determination part 121b when determining whether to transfer each data unit to a higher tier.

The fifth threshold value is a predetermined threshold value of straight access rate to be compared with the straight access rate by the transfer determination part 121b when determining whether to transfer each data unit to a higher tier.

Next, descriptions will be made on functions as the collection part 121a, the transfer determination part 121b, the transfer control part 121c, the switching determination part 121d, and the switching control part 121e implemented by the CPU 121.

The collection part 121a collects, as the plural types of performance information regarding a data unit accessed by the host 2, the access frequency of the data unit, the straight access rate to the data unit, and the cache hit rate of the data unit.

When the determination is made using only the first table T1 for the data unit, the collection part 121a collects only the access frequency and stores the access frequency in the first table T1. When the determination is made using both of the first table T1 and the second table T2 for the data unit, the collection part 121a collects and stores the access frequency in the first table T1, and collects and stores the straight access rate and the cache hit rate in the second table T2.

The transfer determination part 121b refers to both of the first table T1 and the second table T2 when determining whether to transfer the data unit to a higher tier. The transfer determination part 121b determines that a data unit is to be transferred to a higher tier when the access frequency exceeds the second threshold value (threshold value for higher tier transfer determination), the straight access rate is less than the fifth threshold value (threshold value of straight access rate), and the cache hit rate is less than the fourth threshold value (threshold value of cache hit rate). Even though the access frequency exceeds the second threshold value, the transfer determination part 121b determines that the data unit is not to be transferred to a higher tier when either the straight access rate is equal to or greater than the fifth threshold value or the cache hit rate is equal to or greater than the fourth threshold value.

The transfer determination part 121b refers to the first table T1 when performing a determination whether to transfer the data unit to a lower tier. The transfer determination part 121b determines the data unit is to be transferred to a lower tier when the access frequency is less than the third threshold value (threshold value for lower tier transfer determination) which is smaller than the second threshold value (threshold value for higher tier transfer determination).

The transfer control part 121c transfers the data unit, which is determined to be transferred, between the child pools 30, 31, and 32 of the plurality of tiers depending on the result of determination by the transfer determination part 121b.

The switching determination part 121d determines whether the access frequency is larger than the first threshold value (threshold value for switching determination) which is smaller than the second threshold value (threshold value for higher tier transfer determination) and larger than the third threshold value (threshold value for lower tier transfer determination).

When it is determined by the switching determination part 121d that the access frequency is greater than the first threshold value, the switching control part 121e switches to a state where the transfer determination part 121b performs the determination whether to transfer the data unit to a higher tier using both of the first table T1 and the second table T2. When it is determined by the switching determination part 121d that the access frequency is equal to or less than the first threshold value, the switching control part 121e switches to a state where the transfer determination part 121b performs the determination whether to transfer the data unit to a lower tier using only the first table T1.

The switching control part 121e secures, in the second table T2, an area for storing the straight access rate and the cache hit rate regarding the data unit when switching from the state where the lower tier transfer determination is performed to the state where the higher tier transfer determination is performed. The switching control part 121e releases, in the second table T2, the area for storing the straight access rate and the cache hit rate regarding the data unit when switching from the state where the higher tier transfer determination is performed to the state where the lower tier transfer determination is performed.

Next, descriptions will be made on the operations of the control device 10 according to the present embodiment, which has the configuration and functions as described above, with reference to FIG. 3 to FIG. 8.

Figure 3:
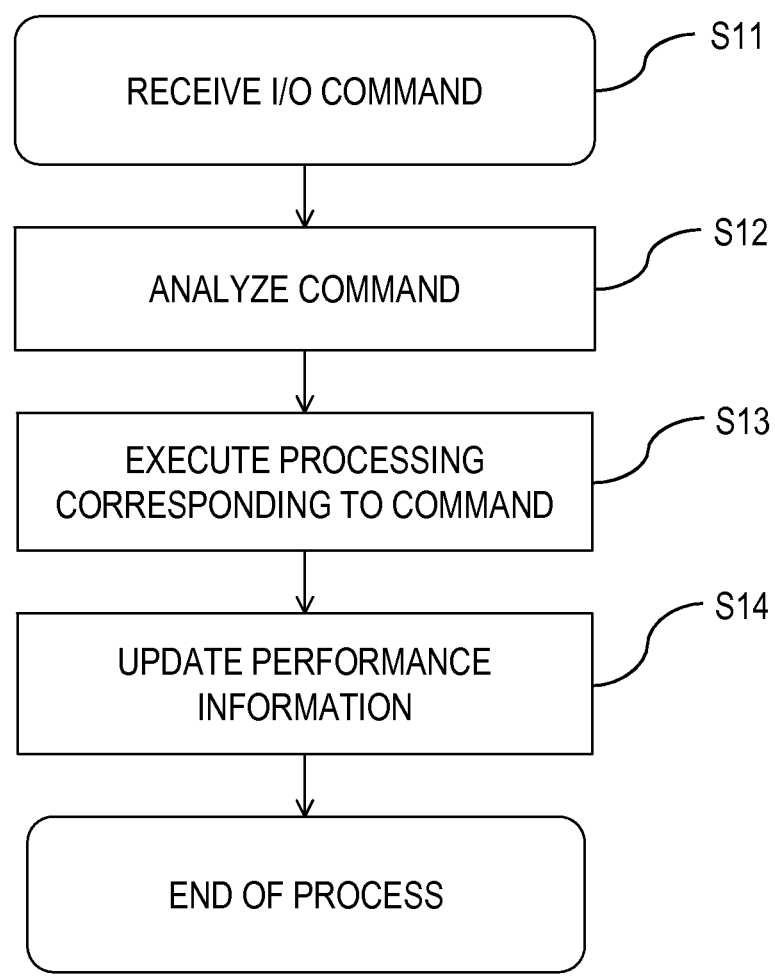
FIG. 3 is a flowchart illustrating operations of a collection part in the control device illustrated in FIG. 2.

First, descriptions will be made on the operations of the collection part 121a, the first table T1, and the second table T2 with reference to FIG. 3 to FIG. 5. FIG. 3 is a flowchart illustrating the operations (table update process) of the collection part 121a in the CM 12 illustrated in FIG. 2. FIG. 4 and FIG. 5 are diagrams illustrating examples of the first table T1 and second table T2, respectively.

When the host 2 issues an I/O command and the CM 12 receives the I/O command from the host 2 (S11), the command is analyzed in the CM 12 (S12). In this case, what portion of which volume residing in the parent pool 3, to which the I/O command is issued, may be determined based on information such as an host logical unit (OLU) number or a host logical block address (OLBA) included in the I/O command.

Accordingly, the collection part 121a may determine whether an access to a data unit targeted by the I/O command is a straight access. The collection part 121a may calculate the straight access rate described above for the data unit on the basis of the determination result. Since the collection part 121a may recognize the data unit targeted by the I/O command, the collection part 121a may also calculate the access frequency with respect to the data unit. The calculation of the straight access rate on the basis of the analysis result obtained at S12 is executed in a case where the determination is performed for the data unit by using both of the first table T1 and the second table T2.

Processing corresponding to the I/O command is executed in accordance with the analysis result at S12 (S13). In this case, since it is determined whether the data unit targeted by the I/O command exists on the cache memory (cache area 122c of the memory 122), that is, whether a cache hit has occurred, the collection part 121a may calculate the cache hit rate for the data unit. The calculation of the cache hit rate on the basis of the processing performed at S13 is executed in a case where the determination is performed for the data unit by using both of the first table T1 and the second table T2.

When the processing corresponding to the I/O command is completed, the collection part 121a updates the first table T1 and the second table T2 on the basis of the performance information collected for the data unit targeted by I/O command at the time of completion of the processing (S14). Information about at which location (offset) of the first table T1 or the second table T2 the performance information of the data unit is stored and registered is held in a table (not illustrated) for managing the chunk (TPPE) described above. When the performance information is updated, the collection part 121a refers to the table to determine an area for storing the performance information of the data unit.

As illustrated in FIG. 4, the first table T1 holds only an I/O count corresponding to the access frequency for each data unit (FTRPE). As illustrated in FIG. 5, the second table T2 holds the cache hit rate and the straight access rate for each data unit (FTRPE) which is subjected to the higher tier transfer determination.

Figure 6:
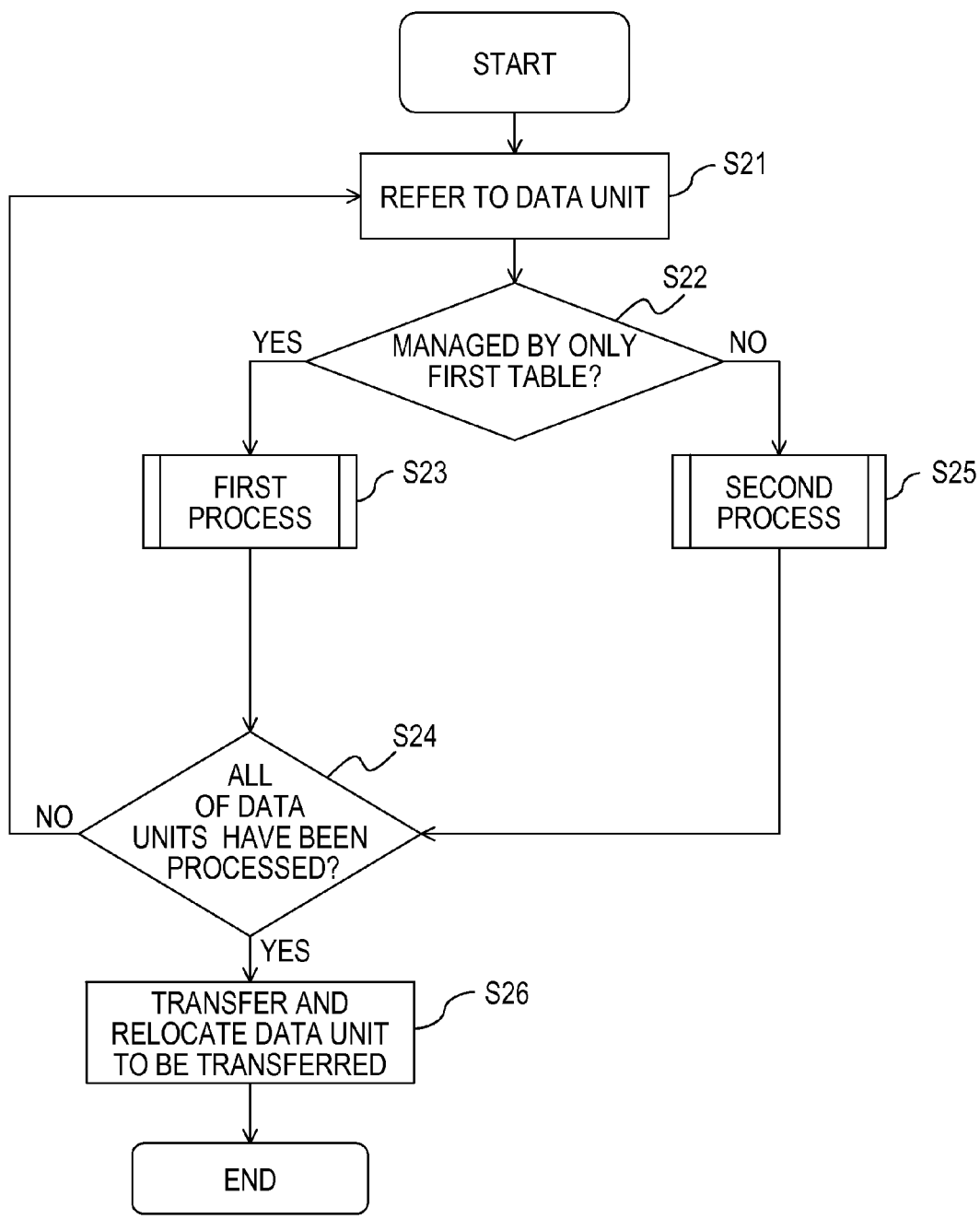
FIG. 6 is a flowchart illustrating operations of a transfer determination part, a transfer control part, a switching determination part, and a switching control part in the control device illustrated in FIG. 2.
Figure 7:
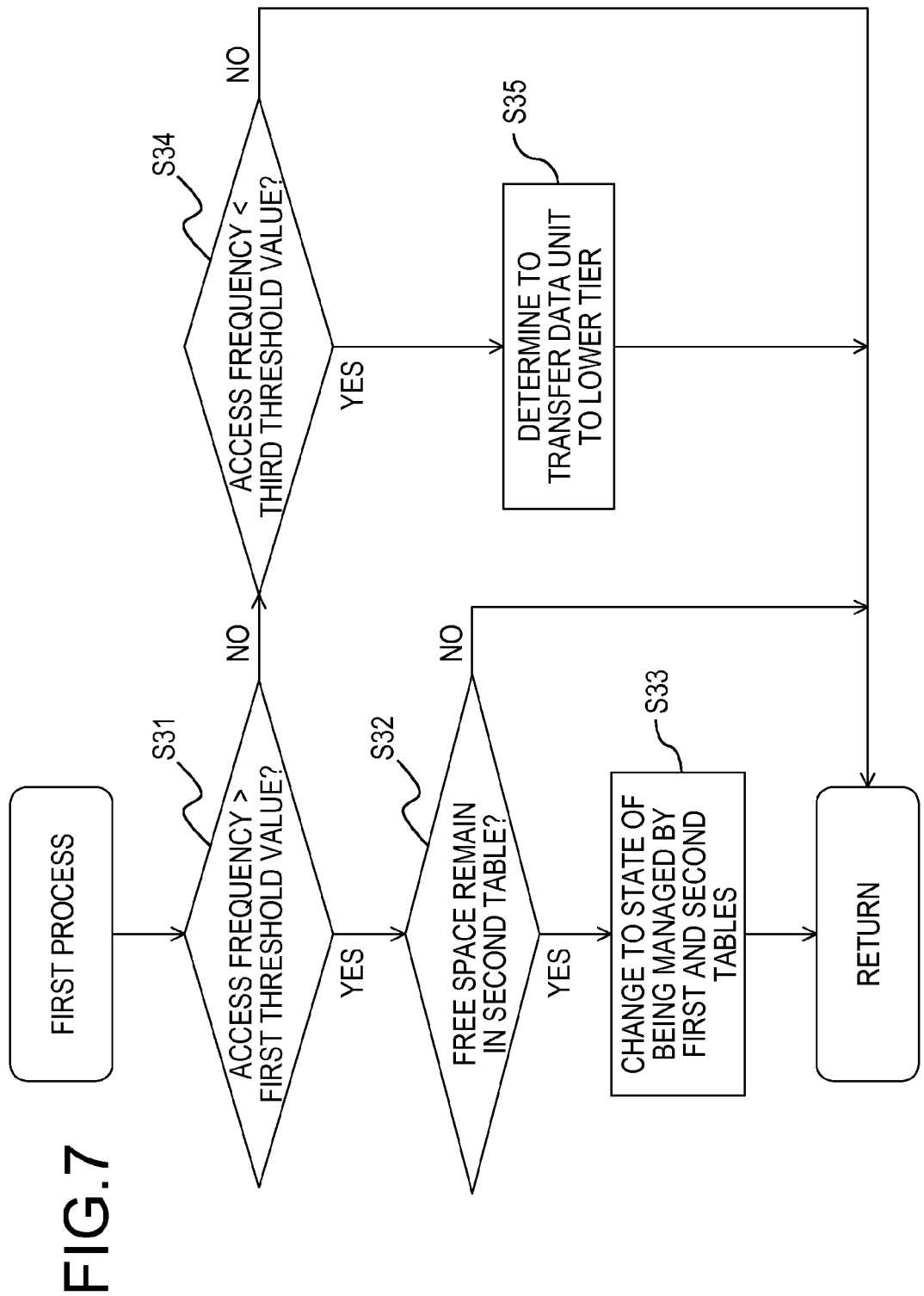
FIG. 7 is a flowchart illustrating a first process of FIG. 6.
Figure 8:
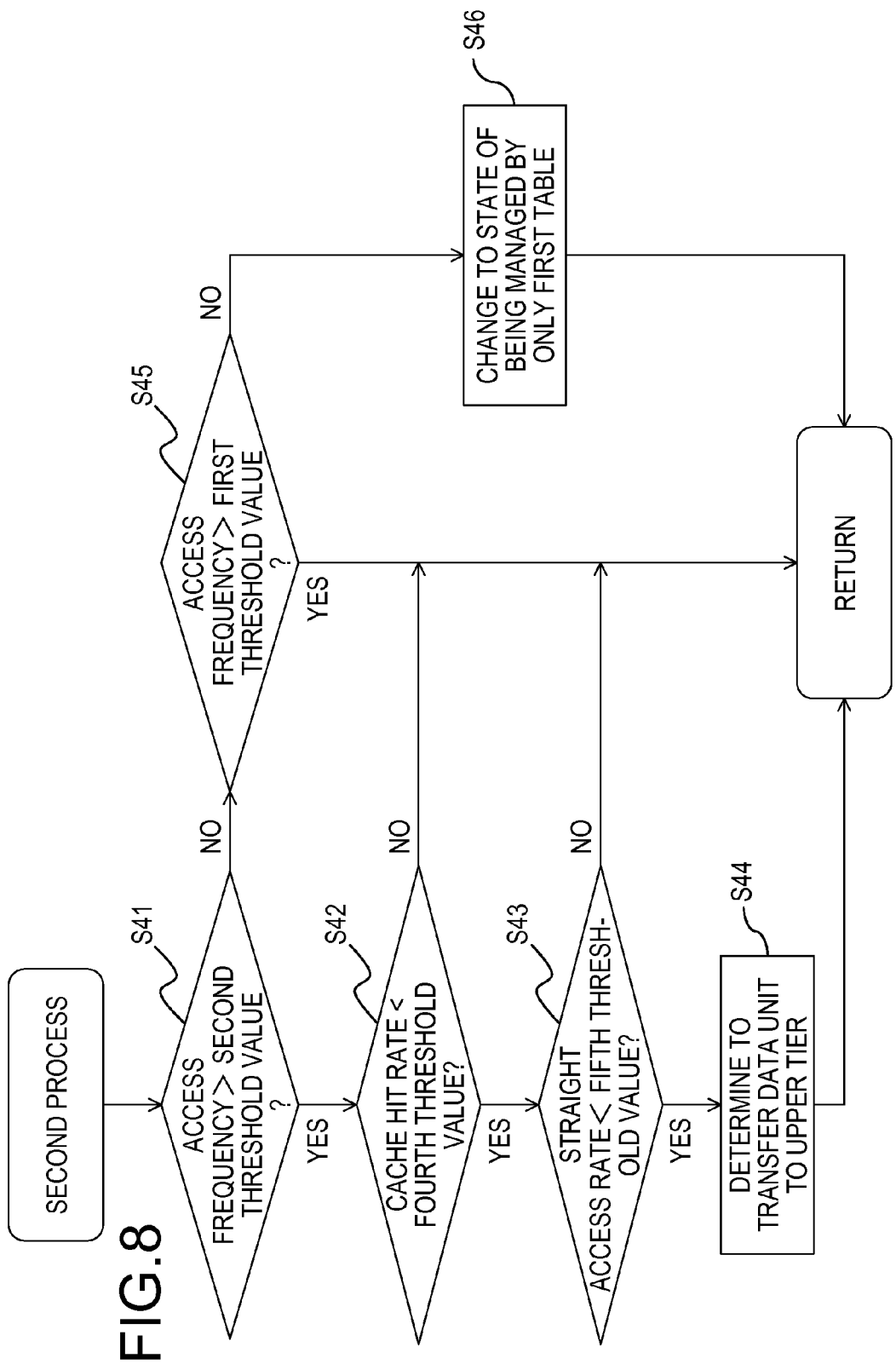
FIG. 8 is a flowchart illustrating a second process of FIG. 6.

Next, descriptions will be made on the operations of the transfer determination part 121b, the transfer control part 121c, the switching determination part 121d, and the switching control part 121e in the CM 12 illustrated in FIG. 2 with reference to the flowcharts illustrated in FIG. 6 to FIG. 8. FIG. 6 is a flowchart illustrating the operations. FIG. 7 and FIG. 8 are flowcharts illustrating a first process (processing at S23) and a second process (processing at S25) of FIG. 6, respectively.

The CPU 121 of the CM 12 regularly executes the control program such that the processes illustrated in FIG. 6 to FIG. 8 are performed. As illustrated in FIG. 6, the CPU 121 selects and refers to a single data unit not yet processed (S21), and determines whether the data unit is managed only by the first table T1 (S22). When it is determined that the data unit is managed only by the first table T1 ("YES" at S22), the CPU 121 executes the first process to be described below with reference to FIG. 7 (S23). Thereafter, the CPU 121 determines whether all of the data units have been processed (S24).

When it is determined that the data unit is not managed only by the first table T1, that is, when the data unit is managed by both of the first table T1 and the second table T2 ("NO" at S22), the CPU 121 executes the second process to be described below with reference to FIG. 8 (S25). Thereafter, the CPU 121 determines whether all of the data units have been processed (S24).

When it is determined that some of the data units have not been processed ("NO" at S24), the process returns to S21. When it is determined that all of the data units have been processed ("YES" at S24), the transfer control part 121c transfers and relocates the data unit, which is determined to be transferred in the first process or the second process, between the child pools 30, 31, and 32 in the plurality of tiers (S26). Thereafter, the CPU 121 ends the process.

Subsequently, descriptions will be made on the first process performed at S23 of FIG. 6 with reference to the flowchart illustrated in FIG. 7. As described above, the first process is performed when the target data unit is managed only by the first table T1. A data unit which is processed for the first time is handled as being managed only by the first table T1.

In the first process, the switching determination part 121d refers to the first table T1 and determines whether the access frequency of the data unit is greater than the first threshold value (threshold value for switching determination) (S31). When it is determined that the access frequency is greater than the first threshold value ("YES" at S31), the switching control part 121e determines whether a free space available for an area storing the straight access rate and the cache hit rate of the data unit remains in the second table T2 (second table information storage area 122b) (S32).

When it is determined that a free space available for the area does not remain in the second table T2 ("NO" at S32), the process returns to S24 of FIG. 6. When it is determined that a free space remains in the second table T2 ("YES" at S32), the switching control part 121e switches to a state where the transfer determination part 121b determines whether to transfer the data unit to a higher tier using both of the first table T1 and the second table T2 (S33). Thereafter, the process returns to S24 of FIG. 6.

As described above, according to the present embodiment, the data unit of which the access frequency exceeds the first threshold value for the first time becomes a data unit to be subjected to the second process without being determined as the data unit to be transferred to a higher tier immediately, even though the access frequency exceeds the second threshold value (threshold value for higher tier transfer determination). That is, the data unit becomes a target data unit to be managed and determined by both of the first table T1 and the second table T2.

When it is determined that the access frequency of the data unit is equal to or less than the first threshold value (threshold value for switching determination) ("NO" at S31), the transfer determination part 121b performs the determination whether the data unit is to be transferred to a lower tier (S34). In this case, the transfer determination part 121b refers to the first table T1 and determines whether the access frequency of the data unit is less than the third threshold value (threshold value for lower tier transfer determination).

When it is determined that the access frequency of the data unit is less than the third threshold value ("YES" at S34), the transfer determination part 121b determines that the data unit is to be transferred to a lower tier (S35) and then, the process returns to S24 of FIG. 6. When it is determined that the access frequency of the data unit is equal to or greater than the third threshold value ("NO" at S34), the process returns to S24 immediately.

Next, descriptions will be made on the second process performed at S25 of FIG. 6 with reference to the flowchart illustrated in FIG. 8. As described above, the second process is performed when the target data unit is managed by both of the first table T1 and the second table T2.

In the second process, the transfer determination part 121b refers to the first table T1 and determines whether the access frequency of the data unit is greater than the second threshold value (threshold value for higher tier transfer determination) (S41). When it is determined that the access frequency is greater than the second threshold value ("YES" at S41), the transfer determination part 121b refers to the second table T2 and determines whether the cache hit rate of the data unit is less than the fourth threshold value (threshold value of cache hit rate) (S42).

When it is determined that the cache hit rate of the data unit is equal to or greater than the fourth threshold value ("NO" at S42), it is considered as a situation that corresponds to the case (2) described above even though the access frequency of the data unit exceeds the second threshold value. Accordingly, the transfer determination part 121b determines the data unit is not to be transferred to a higher tier, and the process returns to S24 of FIG. 6.

When it is determined that the cache hit rate of the data unit is less than the fourth threshold value ("YES" at S42), the transfer determination part 121b refers to the second table T2, and determines whether the cache hit rate of the data unit is less than the fifth threshold value (threshold value of straight access rate) (S43).

When it is determined that the cache hit rate of the data unit is equal to or greater than the fifth threshold value ("NO" at S43), it is considered as a situation that corresponds to the case (1) described above even though the access frequency of the data unit exceeds the second threshold value. Accordingly, the transfer determination part 121b determines the data unit is not to be transferred to a higher tier, and the process returns to S24 of FIG. 6.

When it is determined that the straight access rate of the data unit is less than the fifth threshold value ("YES" at S43), it does not correspond to any of the case (1) and case (2). Accordingly, the transfer determination part 121b determines that the data unit is to be transferred to a higher tier (S44), and the process returns to S24 of FIG. 6.

When it is determined that the access frequency of the data unit is equal to or less than the second threshold value ("NO" at S41), the transfer determination part 121b determines whether the access frequency of the data unit is greater than the first threshold value (threshold value for switching determination) (S45). When it is determined that the access frequency is greater than the first threshold value ("YES" at S45), the process returns to S24 of FIG. 6 immediately.

When it is determined that the access frequency is equal to or less than the first threshold value ("NO" at S45), the switching control part 121e switches to a state where the transfer determination part 121b determines whether to transfer the data unit to a higher tier using only the first table T1 (S46). In this case, the switching control part 121e releases, in the second table T2, the area storing the straight access rate and the cache hit rate of the data unit. Thereafter, the process returns to S24 of FIG. 6.

As described above, according to the present embodiment, when the access frequency of the data unit managed by both the first table T1 and the second table T2 exceeds the second threshold value, it is further determined whether the cache hit rate of the data unit is lower than the fourth threshold value, and the straight access rate of the data unit is lower than the fifth threshold value. Only when the cache hit rate and the straight access rate of the data unit are determined to be lower than the respective threshold values, the data unit is determined to be transferred to a higher tier.

When the cache hit rate is high, the access frequency of the disk is low so that a problem of access path hardly occurs. Therefore, in FIG. 8, the cache hit rate is checked first and only when the cache hit rate is less than the fourth threshold value (that is, when the cache hit rate is low), the straight access rate is checked.

As described above, the following effect may be obtained by the control device 10 or the storage system 1 according to the present embodiment. That is, when a data unit of which the access frequency is relatively high exists, the data unit is not immediately determined to be transferred, and the determination whether to transfer the data unit to a higher tier is performed after collecting the cache hit rate and the straight access rate in the area secured in the second table T2. When the access frequency of the data unit is reduced, the area secured in the second table T2 is released. Accordingly, the straight access rate and the cache hit rate may be collected while suppressing the increase of the memory capacity required for securing the second table T2 to the minimum.

A case where the straight access rate collected for the data unit is high even though the access frequency collected for the data unit is high is considered as corresponding to the case (1) described above. In this case, it is determined that the performance degradation may be caused when the data unit is transferred to a higher tier, and thus, the data unit is not determined to be transferred to a higher tier.

A case where the cache hit rate collected for the data unit is high even though the access frequency collected for the data unit is high is considered as corresponding to the case (2) described above. In this case, it is determined that the performance degradation may be caused when the data unit is transferred to a higher tier, and thus, the data unit is not determined to be transferred to a higher tier.

Therefore, by the control device 10 or the storage system 1 according to the present embodiment, the data may be relocated between the tiers without causing the performance degradation of the storage system 1.

Although the first embodiment has been described in detail, the present disclosure is not limited to the specific embodiment, and may be embodied in various modifications and/or through any changes that may be made thereto without departing from a gist of the present disclosure.

For example, although descriptions have been made on a case where the number of storage devices (child pools) is three in the first embodiment, the present disclosure is not limited thereto, and the number of storage devices (child pools) may be two, or four or more. Although descriptions have been made on a case where the number of CMs is two in the first embodiment, the present disclosure is not limited thereto, and the number of CMs may be one, or three or more.

Although descriptions have been made on a case where three types of the access frequency, the cache hit rate, and the straight access rate are collected and used as the plural types of performance information in the first embodiment, the present disclosure is not limited thereto. For example, as the plural types of performance information, either two types of the access frequency and the cache hit rate or two types of the access frequency and the straight access rate may be collected and used, and otherwise, four or more types of performance information may be collected and used. In both cases, a similar effect to the first embodiment may be obtained.

When the two types of the access frequency and the cache hit rate are used as the plural types of performance information, S43 of the flowchart illustrated in FIG. 8 may be omitted. When the two types of the access frequency and the straight access rate are used as the plural types of performance information, S42 of the flowchart illustrated in FIG. 8 may be omitted.

Although descriptions have been made on a case where the straight access rate is included as one of the plural types of performance information in the first embodiment, the same effect as the first embodiment may be obtained when a cross access ratio is used instead of the straight access rate. Here, the cross access ratio (see the arrow ii in FIG. 9) refers to a ratio of the number of accesses that are indirectly made to each data unit through communications between the CMs to the total number of accesses to each data unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A control device for transferring data units between storage devices, the control device comprising:
a memory; and
a processor coupled to the memory, the processor configured to
collect plural types of performance information including an access frequency of a first data unit, a straight access rate of the first data unit, and a cache hit rate of the first data unit, the access frequency being a number of accesses to the first data unit per unit time, the straight access rate being a ratio of a number of straight accesses to a total number of accesses, and the cache hit rate being a ratio of a number of cache hit accesses to a total number of accesses,
compare the access frequency with a first threshold value,
when it is determined that the access frequency exceeds the first threshold value, determine, on a basis of a relationship between the straight access rate and the cache hit rate, whether to transfer the first data unit from a first storage device which is under control of a first controller to a second storage device which is positioned as a higher tier storage device than the first storage device, and
transfer the first data unit from the first storage device to the second storage device depending on a result of the determination, such that the first data unit is relocated to the higher tier storage device based on the relationship between the access frequency, the straight access rate, and the cache hit rate.

2. The control device according to claim 1, wherein
the straight accesses are accesses performed without involving a second controller different from the first controller, and
the processor is configured to
determine that the first data unit is to be transferred to the second storage device when the access frequency exceeds the first threshold value and the straight access rate is less than a second threshold value, and
determine that the first data unit is not to be transferred to the second storage device when the straight access rate is equal to or greater than the second threshold value even though the access frequency exceeds the first threshold value.

3. The control device according to claim 1, wherein
the cache hit accesses are accesses to the first data unit performed without accessing the first storage device, and
the processor is configured to
determine that the first data unit is to be transferred to the second storage device when the access frequency exceeds the first threshold value and the cache hit rate is less than a second threshold value, and
determine that the first data unit is not to be transferred to the second storage device when the cache hit rate is equal to or greater than the second threshold value even though the access frequency exceeds the first threshold value.

4. The control device according to claim 1, wherein
the straight accesses are accesses performed without involving a second controller different from the first controller, and the cache hit accesses are accesses to the first data unit performed without accessing the first storage device, and
the processor is configured to
determine that the first data unit is to be transferred to the second storage device when the access frequency exceeds the first threshold value, the straight access rate is less than a second threshold value, and the cache hit rate is less than a third threshold value, and
determine that the first data unit is not to be transferred to the second storage device when either the straight access rate is equal to or greater than the second threshold value or the cache hit rate is equal to or greater than the third threshold value even though the access frequency exceeds the first threshold value.

5. The control device according to claim 4, wherein the processor is configured to
determine that the first data unit is to be transferred to a third storage device which is positioned as a lower tier storage device than the first storage device when the access frequency is less than a fourth threshold value which is smaller than the first threshold value.

6. The control device according to claim 5, wherein the processor is configured to
store the access frequency in a first table,
store the straight access rate and the cache hit rate in a second table, determine whether the access frequency is larger than a fifth threshold value which is smaller than the first threshold value and larger than the fourth threshold value, switch, when it is determined that the access frequency is larger than the fifth threshold value, to a first state where whether to transfer the first data unit to the second storage device is determined on basis of both the first table and the second table, and switch, when it is determined that the access frequency is equal to or less than the fifth threshold value, to a second state where whether to transfer the first data unit to the third storage device is determined on basis of only the first table.

7. The control device according to claim 6, wherein the processor is configured to secure, in the second table, an area for storing the straight access rate and the cache hit rate when switching from the second state to the first state.

8. The control device according to claim 7, wherein the processor is configured to release the area when switching from the first state to the second state.

9. A storage system, comprising:
a first storage device which is under control of a first controller;
a second storage device which is positioned as a higher tier storage device than the first storage device; and
a control device for transferring data units between the first and second storage devices, the control device including:
a memory; and
a processor coupled to the memory, the processor configured to
collect plural types of performance information including an access frequency of a first data unit, a straight access rate of the first data unit, and a cache hit rate of the first data unit, the access frequency being a number of accesses to the first data unit per unit time, the straight access rate being a ratio of a number of straight accesses to a total number of accesses, and the cache hit rate being a ratio of a number of cache hit accesses to a total number of accesses,
compare the access frequency with a first threshold value,
when it is determined that the access frequency exceeds the first threshold value, determine, on a basis of a relationship between the straight access rate and the cache hit rate, whether to transfer the first data unit from the first storage device to the second storage device, and
transfer the first data unit from the first storage device to the second storage device depending on a result of the determination, such that the first data unit is relocated to the higher tier storage device based on the relationship between the access frequency, the straight access rate, and the cache hit rate.

10. The storage system according to claim 9, wherein
the straight accesses are accesses performed without involving a second controller different from the first controller, and
the processor is configured to
determine that the first data unit is to be transferred to the second storage device when the access frequency exceeds the first threshold value and the straight access rate is less than a second threshold value, and determine that the first data unit is not to be transferred to the second storage device when the straight access rate is equal to or greater than the second threshold value even though the access frequency exceeds the first threshold value.

11. The storage system according to claim 9, wherein
the cache hit accesses are accesses to the first data unit performed without accessing the first storage device, and
the processor is configured to
determine that the first data unit is to be transferred to the second storage device when the access frequency exceeds the first threshold value and the cache hit rate is less than a second threshold value, and
determine that the first data unit is not to be transferred to the second storage device when the cache hit rate is equal to or greater than the second threshold value even though the access frequency exceeds the first threshold value.

12. The storage system according to claim 9, wherein
the straight accesses are accesses performed without involving a second controller different from the first controller, the cache hit accesses are accesses to the first data unit performed without accessing the first storage device, and
the processor is configured to
determine that the first data unit is to be transferred to the second storage device when the access frequency exceeds the first threshold value, the straight access rate is less than a second threshold value, and the cache hit rate is less than a third threshold value, and
determine that the first data unit is not to be transferred to the second storage device when either the straight access rate is equal to or greater than the second threshold value or the cache hit rate is equal to or greater than the third threshold value even though the access frequency exceeds the first threshold value.

13. The storage system according to claim 12, further comprising:
a third storage device which is positioned as a lower tier storage device than the first storage device,
wherein the processor is configured to determine that the first data unit is to be transferred to the third storage device when the access frequency is less than a fourth threshold value which is smaller than the first threshold value.

14. The storage system according to claim 13, wherein the processor is configured to
store the access frequency in a first table,
store the straight access rate and the cache hit rate in a second table,
determine whether the access frequency is larger than a fifth threshold value which is smaller than the first threshold value and larger than the fourth threshold value,
switch, when it is determined that the access frequency is larger than the fifth threshold value, to a first state where whether to transfer the first data unit to the second storage device is determined on basis of both the first table and the second table, and
switch, when it is determined that the access frequency is equal to or less than the fifth threshold value, to a second state where whether to transfer the first data unit to the third storage device is determined on basis of only the first table.

15. The storage system according to claim 14, wherein the processor is configured to secure, in the second table, an area for storing the straight access rate and the cache hit rate when switching from the second state to the first state.

16. The storage system according to claim 15, wherein the processor is configured to
release the area when switching from the first state to the second state.

17. A non-transitory computer-readable recording medium having stored therein a program that causes a computer to execute a process for transferring data units between storage devices, the process comprising:
collecting plural types of performance information including an access frequency of a first data unit, a straight access rate of the first data unit, and a cache hit rate of the first data unit, the access frequency being a number of accesses to the first data unit per unit time, the straight access rate being a ratio of a number of straight accesses to a total number of accesses, and the cache hit rate being a ratio of a number of cache hit accesses to a total number of accesses;
comparing the access frequency with a first threshold value;
when it is determined at the comparing that the access frequency exceeds the first threshold value, determining, on a basis of a relationship between the straight access rate and the cache hit rate, whether to transfer the first data unit from a first storage device which is under control of a first controller to a second storage device which is positioned as a higher tier storage device than the first storage device; and
transferring the first data unit from the first storage device to the second storage device depending on a result of the determination, such that the first data unit is relocated to the higher tier storage device based on the relationship between the access frequency, the straight access rate, and the cache hit rate.

18. The non-transitory computer-readable recording medium according to claim 17, wherein
the straight accesses are accesses performed without involving a second controller different from the first controller, and the cache hit accesses are accesses performed without accessing the first storage device, and
the process comprises:
determining that the first data unit is to be transferred to the second storage device when the access frequency exceeds the first threshold value, the straight access rate is less than a second threshold value, and the cache hit rate is less than a third threshold value; and
determining that the first data unit is not to be transferred to the second storage device when either the straight access rate is equal to or greater than the second threshold value or the cache hit rate is equal to or greater than the third threshold value even though the access frequency exceeds the first threshold value.

19. The non-transitory computer-readable recording medium according to claim 18, the process further comprising:
determining that the first data unit is to be transferred to a third storage device which is positioned as a lower tier storage device than the first storage device when the access frequency is less than a fourth threshold value which is smaller than the first threshold value.

20. The non-transitory computer-readable recording medium according to claim 19, the process further comprising:
storing the access frequency in a first table;
storing the straight access rate and the cache hit rate in a second table;
determining whether the access frequency is larger than a fifth threshold value which is smaller than the first threshold value and larger than the fourth threshold value;
switching, when it is determined that the access frequency is larger than the fifth threshold value, to a first state where whether to transfer the first data unit to the second storage device is determined on a basis of both the first table and the second table; and
switching, when it is determined that the access frequency is equal to or less than the fifth threshold value, to a second state where whether to transfer the first data unit to the third storage device is determined on a basis of only the first table.

* * * * *